US012809797B2

(12) United States Patent
Yang et al.

(10) Patent No.: US 12,809,797 B2
(45) Date of Patent: Nov. 24, 2026

(54) DATA ACCESS METHOD, APPARATUS, AND SYSTEM

(71) Applicant: HUAWEI TECHNOLOGIES CO., LTD., Shenzhen (CN)

(72) Inventors: Dong Yang, Hangzhou (CN); Yibin Wang, Beijing (CN); Fujun Yue, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 19/004,019

(22) Filed: Dec. 27, 2024

(65) Prior Publication Data

US 2025/0139032 A1 May 1, 2025

Related U.S. Application Data

(63) Continuation of application No. PCT/CN2023/100708, filed on Jun. 16, 2023.

(30) Foreign Application Priority Data

Jun. 28, 2022 (CN) ......................... 202210749781.9

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ...... G06F 13/20; G06F 2213/40; G06F 3/061; G06F 3/0635; G06F 3/067; G06F 16/14; G06F 16/148; G06F 16/172; G06F 16/182; G06F 16/907; G06F 16/13
See application file for complete search history.

(56) References Cited

U.S. PATENT DOCUMENTS 8,229,972 B2 * 7/2012 Ahmad ................. G06F 3/0611 707/802
11,556,474 B1 * 1/2023 Bonanno ............. G06F 12/0897
2011/0029580 A1 * 2/2011 Popovski .............. G06F 3/0631 711/E12.001
2015/0286722 A1 * 10/2015 Chang ..................... G06F 16/48 707/706

(Continued)

FOREIGN PATENT DOCUMENTS

CN 109521962 A 3/2019
CN 113032335 A 6/2021
CN 114283048 A 4/2022

*Primary Examiner* — Phong H Dang
(74) *Attorney, Agent, or Firm* — Leydig, Voit & Mayer, Ltd.

(57) ABSTRACT

A method is applied to a compute node including a first storage medium and a second storage medium, a data access rate of the first storage medium is greater than a data access rate of the second storage medium which stores metadata of a first dataset, the first dataset is stored in a storage system connected to the compute node via a network. The method includes: obtaining a first input/output request; searching the first storage medium for metadata of first data based on the first input/output request; obtaining the metadata of the first data from the second storage medium when the metadata of the first data is not found in the first storage medium; and obtaining the first data from the storage system based on the metadata of the first data.

18 Claims, 5 Drawing Sheets

(56) References Cited

U.S. PATENT DOCUMENTS

| | | | | |
|---|---|---|---|---|
| 2017/0160987 | A1* | 6/2017 | Royer, Jr. | G06F 3/0653 |
| 2021/0241153 | A1* | 8/2021 | Branchaud-Charron | G06N 20/00 |
| 2021/0382855 | A1* | 12/2021 | Cronan | G06F 16/13 |

* cited by examiner

DATA ACCESS METHOD, APPARATUS, AND SYSTEM

CROSS-REFERENCE TO RELATED APPLICATIONS

This application is a continuation of International Application No. PCT/CN2023/100708, filed on Jun. 16, 2023, which claims priority to Chinese Patent Application No. 202210749781.9, filed on Jun. 28, 2022. The disclosures of the aforementioned applications are hereby incorporated by reference in their entireties.

TECHNICAL FIELD

This disclosure relates to the field of data processing, and in particular, to a data access method, apparatus, and system.

BACKGROUND

Datasets used for artificial intelligence (AI) training usually include lots of small files (LOSF). These datasets have a large amount of metadata, and a total amount of data in the datasets is huge. A training node cannot store all the datasets locally. Therefore, these datasets are usually stored in a distributed storage system that is communicatively connected to the training node. The metadata is data that describes data-related information or attributes. The metadata of the dataset may include a name, a specification, a size, and the like of the dataset. In addition, the metadata of the dataset usually includes directory data of the dataset, metadata of a file included in the dataset, metadata of data in the file included in the dataset, and the like. The metadata of the file may include, for example, a name of a directory in which the file is located, a file name, access permission, creation time, access time, and a file size. The metadata of the data included in the file may include, for example, a length of the data, a storage address of the data, and information about the file in which the data is located.

During the AI training, the training node first traverses the datasets that are used for the AI training and that are stored in the distributed storage system, to obtain the metadata (for example, the name, the specification, and the size of the dataset) of the dataset. Then, the training node determines, based on the metadata of the dataset and a configuration parameter of a training task, an amount of data that needs to be obtained each time. The training node obtains the data in the dataset from the distributed storage system based on the amount of data that needs to be obtained each time. Each time after the training node obtains the data in the dataset from the distributed storage system, the training node performs AI training based on the data obtained this time. The training node continuously performs AI training based on the obtained data until the training task is completed.

However, due to reasons such as metadata management and network communication, efficiency of obtaining the metadata of the dataset by the training node from the distributed storage system is low. Consequently, efficiency of obtaining the data in the dataset by the training node is low.

SUMMARY

This disclosure provides a data access method, apparatus, and system, to help improve efficiency of obtaining metadata of a dataset. This improves efficiency of obtaining the dataset. Technical solutions of this disclosure are as follows.

According to a first aspect, a data access method is provided, applied to a compute node, where the compute node includes a first storage medium and a second storage medium, a data access rate of the first storage medium is greater than a data access rate of the second storage medium, the second storage medium stores metadata of a first dataset, the first dataset is stored in a storage system, and the storage system is connected to the compute node via a network. The method includes: obtaining a first input/output (I/O) request, where the first I/O request is used to access first data in the first dataset; searching the first storage medium for metadata of the first data based on the first I/O request; obtaining the metadata of the first data from the second storage medium when the metadata of the first data is not found in the first storage medium; and obtaining the first data from the storage system based on the obtained metadata of the first data.

In the technical solutions provided in this disclosure, because the second storage medium of the compute node stores the metadata of the first dataset, the compute node may obtain the metadata of the first data from the second storage medium of the compute node when the compute node does not find the metadata of the first data in the first storage medium of the compute node based on the first I/O request, and obtain the first data from the storage system based on the metadata of the first data. Compared with obtaining the metadata of the first data from the storage system, that the compute node obtains the metadata of the first data from the second storage medium of the compute node is faster and more efficient. Storing the metadata of the first dataset in the second storage medium of the compute node can improve efficiency of obtaining the metadata of the first dataset by the compute node. This improves efficiency of obtaining the first dataset by the compute node.

Optionally, the first I/O request carries a storage path of the first data in the storage system, and the obtaining the metadata of the first data from the second storage medium includes: determining a storage path of the metadata of the first data in the second storage medium based on the storage path that is of the first data in the storage system and that is carried in the first I/O request; and obtaining the metadata of the first data based on the storage path of the metadata of the first data in the second storage medium.

In the technical solutions provided in this disclosure, because the first I/O request carries the storage path of the first data in the storage system, the compute node may determine the storage path of the metadata of the first data in the second storage medium based on the storage path that is of the first data in the storage system and that is carried in the first I/O request, and further obtain the metadata of the first data from the second storage medium based on the storage path of the metadata of the first data in the second storage medium.

Optionally, the compute node stores a mapping relationship between a storage path of the first dataset in the storage system and a storage path of the metadata of the first dataset in the second storage medium. The determining a storage path of the metadata of the first data in the second storage medium based on the storage path that is of the first data in the storage system and that is carried in the first I/O request includes: determining the storage path of the metadata of the first data in the second storage medium based on the mapping relationship and the storage path that is of the first data in the storage system and that is carried in the first I/O request.

In the technical solutions provided in this disclosure, because the compute node stores the mapping relationship between the storage path of the first dataset in the storage system and the storage path of the metadata of the first dataset in the second storage medium, the compute node may determine the storage path of the metadata of the first dataset in the second storage medium based on the mapping relationship and the storage path that is of the first data in the storage system and that is carried in the first I/O request, to determine the storage path of the metadata of the first data in the second storage medium.

Optionally, the method further includes: in response to a $1^{st}$ I/O request used to access data in the first dataset, reading the metadata of the first dataset from the storage system to the second storage medium, and establishing the mapping relationship. In other words, when the compute node processes the $1^{st}$ I/O request used to access the data in the first dataset, the compute node reads the metadata of the first dataset from the storage system to the second storage medium of the compute node. Then, the compute node establishes the mapping relationship based on the storage path of the first dataset in the storage system and the storage path of the metadata of the first dataset in the second storage medium.

In the technical solutions provided in this disclosure, when processing the $1^{st}$ I/O request used to access the data in the first dataset, the compute node reads the metadata of the first dataset from the storage system to the second storage medium of the compute node, so that the compute node obtains metadata of the data in the first dataset from the second storage medium of the compute node when processing an I/O request used to access the data in the first dataset. This improves efficiency of obtaining the metadata of the first dataset. In addition, after the compute node reads the metadata of the first dataset from the storage system to the second storage medium of the compute node, the compute node establishes the mapping relationship between the storage path of the first dataset in the storage system and the storage path of the metadata of the first dataset in the second storage medium, so that the compute node determines, based on the mapping relationship when processing the I/O request used to access the data in the first dataset, a storage path of metadata of the data that the I/O request requests to access in the second storage medium.

Optionally, the method further includes: in response to a $1^{st}$ I/O request used to access data in the first dataset, reading the metadata of the first dataset from the storage system to the second storage medium based on the mapping relationship. In other words, the mapping relationship is preconfigured. When processing the $1^{st}$ I/O request used to access the data in the first dataset, the compute node reads the metadata of the first dataset from the storage system to the second storage medium of the compute node based on the preconfigured mapping relationship.

In the technical solutions provided in this disclosure, when processing the $1^{st}$ I/O request used to access the data in the first dataset, the compute node reads the metadata of the first dataset from the storage system to the second storage medium of the compute node, so that the compute node obtains metadata of the data in the first dataset from the second storage medium of the compute node when processing an I/O request used to access the data in the first dataset. This improves efficiency of obtaining the metadata of the first dataset.

Optionally, the first I/O request is the $1^{st}$ I/O request used to access the data in the first dataset.

Optionally, the first I/O request is not the $1^{st}$ I/O request used to access the data in the first dataset, and before that the compute node reads the metadata of the first dataset from the storage system to the second storage medium, the method further includes: The compute node obtains the $1^{st}$ I/O request used to access the data in the first dataset.

Optionally, the first storage medium is a non-persistent storage medium, and the second storage medium is a persistent storage medium.

Optionally, the first storage medium is a cache, and the second storage medium is a hard disk. The cache is a high-speed data storage layer, and data access efficiency of the cache is greater than data access efficiency of the hard disk. Some data in the hard disk may be stored in the cache. In this way, when the data is subsequently accessed again, the data is first searched for in the cache, and if the data is not found in the cache, the data is searched for in the hard disk. The cache is used to improve data access efficiency.

Optionally, the compute node is any training node in an AI model training cluster, and the first dataset is a dataset used for AI model training. For example, the first dataset is a small-file dataset, and the first dataset includes lots of small files.

Optionally, the storage system is a distributed storage system. For example, the distributed storage system is a distributed file system. The distributed storage system is a system in which data is stored in a plurality of independent storage nodes (for example, storage servers) in a distributed manner. The distributed storage system uses an extensible system structure, and uses the plurality of storage nodes to share storage load. This improves reliability, availability, and access efficiency of the system, and facilitates expansion.

Optionally, the compute node includes an interception module, and before the obtaining the metadata of the first data from the second storage medium, the method further includes: intercepting the first I/O request via the interception module.

In the technical solutions provided in this disclosure, the compute node intercepts the first I/O request via the interception module of the compute node when the compute node does not find the metadata of the first data in the first storage medium of the compute node based on the first I/O request, so that the compute node may obtain the metadata of the first data from the second storage medium of the compute node instead of obtaining the metadata of the first data from the storage system. This improves the efficiency of obtaining the metadata of the first dataset by the compute node.

Optionally, the interception module includes a dynamic link library, where the dynamic link library includes an interception function, and the interception function is used to intercept the first I/O request.

Optionally, the compute node further includes an application, and the obtaining a first I/O request includes: obtaining the first I/O request by using the application.

Optionally, before the reading the metadata of the first dataset from the storage system to the second storage medium, the method further includes: traversing the first dataset stored in the storage system, to obtain the metadata of the first dataset; and storing the metadata of the first dataset in the storage system.

Optionally, in the storage system, the metadata of the first dataset is stored in a lower-level directory of the first dataset.

According to a second aspect, a data access apparatus is provided, including modules configured to perform the method provided in any one of the first aspect or the optional manners of the first aspect. The modules may be implemented based on software, hardware, or a combination of software and hardware, and may be randomly combined or divided based on specific implementation.

According to a third aspect, a data access apparatus is provided, including a memory and a processor, where the memory is configured to store a computer program, and the processor is configured to execute the computer program stored in the memory, to enable the data access apparatus to perform the method provided in any one of the first aspect or the optional manners of the first aspect.

According to a fourth aspect, a data access system is provided, including a compute node and a storage system, where the compute node is connected to the storage system via a network, and the compute node includes the apparatus provided in any one of the second aspect or the optional manners of the second aspect.

According to a fifth aspect, a computer-readable storage medium is provided. The computer-readable storage medium stores a computer program. When the computer program is executed, the method provided in any one of the first aspect or the optional manners of the first aspect is implemented.

According to a sixth aspect, a computer program product is provided. The computer program product includes a program or code. When the program or the code is executed, the method provided in any one of the first aspect or the optional manners of the first aspect is implemented.

According to a seventh aspect, a chip is provided. The chip includes a programmable logic circuit and/or program instructions. When being run, the chip is configured to implement the method provided in any one of the first aspect or the optional manners of the first aspect.

The technical solutions provided in this disclosure bring the following beneficial effects.

This disclosure provides a data access method, apparatus, and system. The method is applied to a compute node, where the compute node includes a first storage medium and a second storage medium, a data access rate of the first storage medium is greater than a data access rate of the second storage medium, the second storage medium stores metadata of a first dataset, and the first dataset is stored in a storage system connected to the compute node via a network. After the compute node receives a first I/O request used to access first data in the first dataset, the compute node searches the first storage medium of the compute node for metadata of the first data. The compute node obtains the metadata of the first data from the second storage medium of the compute node when the metadata of the first data is not found in the first storage medium of the compute node, and obtains the first data from the storage system based on the metadata of the first data. In this disclosure, the second storage medium of the compute node stores the metadata of the first dataset, so that the compute node may obtain the metadata of the first data from the second storage medium of the compute node when the compute node does not find the metadata of the first data in the first storage medium of the compute node based on the first I/O request. Compared with obtaining the metadata of the first data from the storage system, that the compute node obtains the metadata of the first data from the second storage medium of the compute node is faster and more efficient. Therefore, storing the metadata of the first dataset in the second storage medium of the compute node can improve efficiency of obtaining the metadata of the first dataset by the compute node. This improves efficiency of obtaining the first dataset by the compute node.

DESCRIPTION OF EMBODIMENTS

Figure 1:
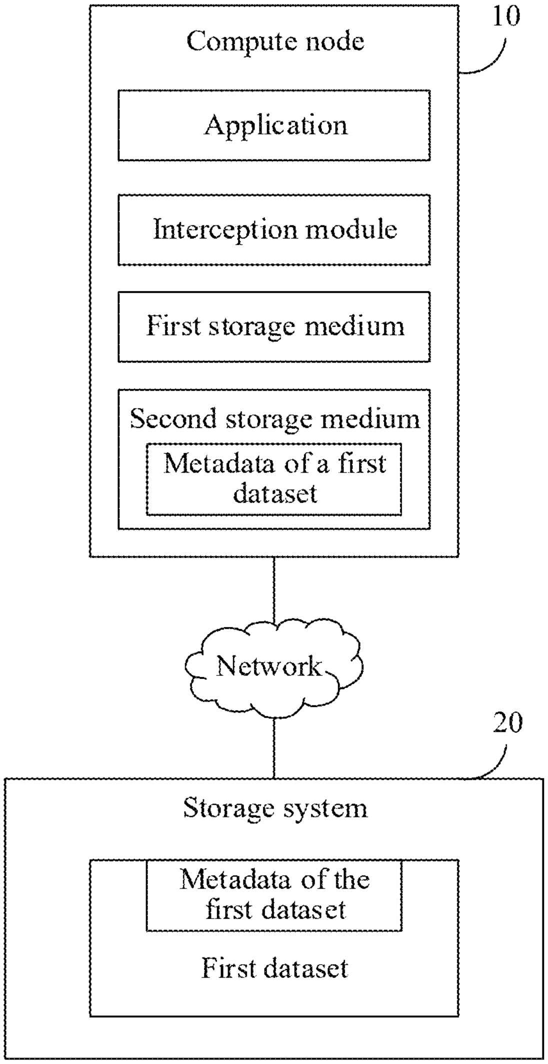
FIG. 1 is a schematic diagram of a structure of a data access system according to an embodiment of this disclosure.

The following further describes in detail embodiments of this disclosure with reference to the accompanying drawings.

Datasets used for AI training usually include LOSF. These datasets have a large amount of metadata, and a total amount of data in the datasets is huge. A training node cannot store the full datasets locally. Therefore, these datasets are usually stored in a distributed storage system. During the AI training, the training node first obtains, from the distributed storage system, the metadata of the dataset used for the AI training, then obtains the data in the dataset from the distributed storage system for a plurality of times based on the metadata of the dataset, and performs AI training based on the obtained data until a training task is completed. However, due to reasons such as metadata management and network communication, efficiency of obtaining the metadata of the dataset by the training node from the distributed storage system is low.

A small-file combination storage policy is the most successful policy for optimizing the LOSF. The policy combines a plurality of small files into one large file for storage (that is, stores data in the plurality of small files in one large file), and establishes an index structure for searching the large file for the small file. This implements efficient storage of the LOSF. A client determines, by searching the index structure, the large file in which the data in the small file is located, and offset of the data in the small file in the large file, and accesses data in the large file based on the offset of the data in the small file in the large file, where this part of data is the data in the small file. The policy can reduce an amount of data in the metadata, improve efficiency of searching for the metadata, and reduce a delay of an I/O operation of file reading and writing. In addition, a plurality of small files that may be continuously accessed can be stored in one large file, so that locality between the small files is increased and random access to the small files is changed to sequential access. This improves access performance. In addition, the policy can reduce disk fragmentation problems caused by independent storage of the small files and improve disk utilization. After the combination, access procedures of the small files are changed from many open operations to a seek operation in the large file. The small files can be accessed by opening the large file. Although the policy reduces an amount of metadata, the index structure for searching the large file for the small files is enlarged. The index structure is stored in the distributed storage system, and actually, access to the metadata (access to the index structure) is not accelerated. In addition, in the policy, an I/O procedure of the client needs to be modified to adapt to a change from reading the small files to reading the combined large file, and use costs are high. When the policy is used in an AI training scenario, the datasets need to be repackaged, a training framework needs to be adapted to packaged datasets, and use costs are high.

A virtual file system (VFS) is one of subsystems of a Linux kernel. The VFS provides a unified interface for an application (or referred to as the client) to operate a file and a file system, and shields differences and operation details of different file systems. To reduce access to a disk, each time the VFS accesses a file in the disk, the VFS caches metadata of the accessed file. When the VFS accesses the file next time, the VFS directly obtains the metadata of the file from a cache of the VFS, and does not need to obtain the metadata of the file from the disk. This improves efficiency of obtaining the metadata. However, for a file, metadata of the file can be cached in the VFS only after the file is accessed by the VFS for at least one time. When accessing the file for a $1^{st}$ time, the VFS still needs to obtain the metadata of the file from the disk. A process in which the VFS accesses the file for the $1^{st}$ time is not accelerated. In addition, the cache of the VFS is small, and data in the cache is easily washed out. After the metadata in the cache is washed out, the metadata of the file still needs to be obtained from the disk. As a result, efficiency of obtaining the metadata is low.

In view of this, embodiments of this disclosure provide a data access method, apparatus, and system. The method is applied to a compute node, where the compute node is connected to a storage system via a network, the compute node includes a first storage medium and a second storage medium, a data access rate of the first storage medium is greater than a data access rate of the second storage medium, the second storage medium stores metadata of a first dataset, and the first dataset is stored in the storage system. For example, the first storage medium is a cache, and the second storage medium is a hard disk. After the compute node obtains a first I/O request used to access first data in the first dataset, the compute node searches the first storage medium of the compute node for metadata of the first data based on the first I/O request. The compute node obtains the metadata of the first data from the second storage medium of the compute node when the metadata of the first data is not found in the first storage medium, and obtains the first data from the storage system based on the metadata of the first data. Because the second storage medium of the compute node stores the metadata of the first dataset, the compute node may obtain the metadata of the first data from the second storage medium of the compute node when the compute node does not find the metadata of the first data in the first storage medium of the compute node based on the first I/O request. Compared with obtaining the metadata of the first data from the storage system, that the compute node obtains the metadata of the first data from the second storage medium of the compute node is faster and more efficient, so that efficiency of obtaining the metadata of the first dataset can be improved. This improves efficiency of obtaining the first dataset. In addition, in this disclosure, small files do not need to be combined into a large file for storage, an I/O procedure of a client does not need to be modified, and use costs are low. In addition, the second storage medium in this disclosure may be the hard disk, storage space of the second storage medium is large, a probability that data in the second storage medium is washed out is low, and a hit rate of searching the second storage medium for the metadata of the first data is high.

The following describes technical solutions in this disclosure with reference to the accompanying drawings. An application scenario of this disclosure is first described.

The application scenario related to the technical solutions provided in embodiments of this disclosure is a data access system. FIG. 1 is a schematic diagram of a structure of a data access system according to an embodiment of this disclosure. The data access system includes a compute node 10 and a storage system 20, and the compute node 10 is connected to the storage system 20 via a network. The compute node 10 includes a first storage medium and a second storage medium. A data access rate of the first storage medium is greater than a data access rate of the second storage medium. The second storage medium stores metadata of a first dataset, and the first dataset is stored in the storage system 20.

Optionally, the first storage medium is a non-persistent storage medium, and the second storage medium is a persistent storage medium. The non-persistent storage medium is used to temporarily store data. After the system is powered off, the data stored in the non-persistent storage medium is lost. The persistent storage medium is used to persistently store data. After the system is powered off, the data stored in the persistent storage medium is not lost. For example, the non-persistent storage medium is a cache, and the cache may include a central processing unit (CPU) cache or a random access memory (RAM). The persistent storage medium may be a hard disk, and the hard disk may include a hard disk drive, a magnetic disk, a solid-state drive, a shingled magnetic recording hard disk, or the like.

As shown in FIG. 1, the storage system 20 further stores the metadata of the first dataset. In the storage system 20, the metadata of the first dataset may be stored in a lower-level directory of the first dataset. In this embodiment of this disclosure, when the compute node 10 obtains a $1^{st}$ I/O request used to access data in the first dataset, the compute node 10 reads the metadata of the first dataset from the storage system 20 to the second storage medium of the compute node 10 based on the $1^{st}$ I/O request, so that the second storage medium of the compute node 10 stores the metadata of the first dataset. Then, when the compute node 10 processes an I/O request used to access any piece of data in the first dataset, the compute node 10 may obtain metadata of the any piece of data from the second storage medium of the compute node 10, and obtain the any piece of data from the storage system 20 based on the metadata of the any piece of data. Further, the compute node 10 may cache, in the first storage medium of the compute node 10, the metadata that is of the any piece of data and that is obtained from the second storage medium of the compute node 10. The $1^{st}$ I/O request used to access the data in the first dataset may be one I/O request that is obtained by the compute node 10 and that is used to access the data in the first dataset. When the compute node 10 obtains the I/O request, the second storage medium of the compute node 10 does not store the metadata of the first dataset. The $1^{st}$ I/O request used to access the data in the first dataset may be a $1^{st}$ I/O request that is obtained by the compute node 10 and that is used to access the data in the first dataset, or may not be a $1^{st}$ I/O request that is obtained by the compute node 10 and that is used to access the data in the first dataset. For example, when the compute node 10 obtains an I/O request 1 used to access the data in the first dataset, the second storage medium of the compute node 10 does not store the metadata of the first dataset. The I/O request 1 may be the $1^{st}$ I/O request that is obtained by the compute node 10 and that is used to access the data in the first dataset. The compute node 10 reads the metadata of the first dataset from the storage system 20 to the second storage medium of the compute node 10 based on the I/O request 1. Then, for some reasons, the compute node 10 deletes the metadata of the first dataset in the second storage medium of the compute node 10. In this case, when the compute node 10 obtains an I/O request 2 used to access the data in the first dataset, the second storage medium of the compute node 10 still does not store the metadata of the first dataset. The I/O request 2 is also the 1$^{st}$ I/O request that is obtained by the compute node 10 and that is used to access the data in the first dataset. The compute node 10 reads the metadata of the first dataset from the storage system 20 to the second storage medium of the compute node 10 based on the I/O request 2.

In an optional embodiment, when the compute node 10 obtains the I/O request used to access the any piece of data in the first dataset, the compute node 10 searches the first storage medium of the compute node 10 for the metadata of the any piece of data based on the I/O request. If the compute node 10 finds the metadata of the any piece of data in the first storage medium of the compute node 10, the compute node 10 obtains the metadata of the any piece of data from the first storage medium of the compute node 10, and obtains the any piece of data from the storage system 20 based on the metadata of the any piece of data. If the compute node 10 does not find the metadata of the any piece of data in the first storage medium of the compute node 10, the compute node 10 searches the second storage medium of the compute node 10 for the metadata of the any piece of data based on the I/O request. If the compute node 10 finds the metadata of the any piece of data in the second storage medium of the compute node 10, the compute node 10 obtains the metadata of the any piece of data from the second storage medium of the compute node 10, and obtains the any piece of data from the storage system 20 based on the metadata of the any piece of data. Further, the compute node 10 caches, in the first storage medium of the compute node 10, the metadata that is of the any piece of data and that is obtained from the second storage medium of the compute node 10. If the compute node 10 does not find the metadata of the any piece of data in the second storage medium of the compute node 10 (in this case, it may be considered that the I/O request used to access the any piece of data is the 1$^{st}$ I/O request used to access the data in the first dataset), the compute node 10 reads the metadata of the first dataset from the storage system 20 to the second storage medium of the compute node 10 based on the I/O request. Then, the compute node 10 obtains the metadata of the any piece of data from the second storage medium of the compute node 10, and obtains the any piece of data from the storage system 20 based on the metadata of the any piece of data. Further, the compute node 10 caches, in the first storage medium of the compute node 10, the metadata that is of the any piece of data and that is obtained from the second storage medium of the compute node 10. The metadata of the any piece of data may include a length of the any piece of data, a storage address of the any piece of data in the storage system 20, and the like.

According to a current I/O processing procedure, when the compute node processes the I/O request used to access the any piece of data in the first dataset, if the compute node does not find the metadata of the any piece of data in the cache of the compute node, the compute node directly obtains the metadata of the any piece of data from the storage system instead of searching the hard disk of the compute node for the metadata of the any piece of data. In this embodiment of this disclosure, when the compute node 10 processes the I/O request used to access the any piece of data in the first dataset, if the compute node 10 does not find the metadata of the any piece of data in the first storage medium (for example, the cache) of the compute node 10, the compute node 10 may intercept the I/O request by using an I/O interception technology, and change an access path of the I/O request to a storage path of the metadata of the any piece of data in the second storage medium (for example, the hard disk) of the compute node 10. The compute node 10 obtains the metadata of the any piece of data from the second storage medium of the compute node 10 based on the changed access path instead of obtaining the metadata of the any piece of data from the storage system 20. In this way, efficiency of obtaining the metadata by the compute node 10 can be improved. Optionally, as shown in FIG. 1, the compute node 10 includes an interception module, and the compute node 10 intercepts the I/O request via the interception module. The interception module is a functional module developed based on the I/O interception technology. For example, the I/O interception technology is an interception technology based on an environment variable LD PRELOAD of a Linux system. The interception module may include a dynamic link library. The dynamic link library includes an interception function. The interception function is used to intercept the I/O request. The compute node 10 intercepts the I/O request by executing the interception function.

In an optional embodiment, the compute node 10 further includes an application (or referred to as a client). The application may generate the I/O request used to access the data in the first dataset, or receive an I/O request that is from outside of the compute node 10 and that is used to access the data in the first dataset. The compute node 10 obtains, by using the application, the I/O request used to access the data in the first dataset.

In this embodiment of this disclosure, the metadata of the first dataset stored in the storage system 20 may be obtained by preprocessing the first dataset stored in the storage system 20. The preprocessing may be performed by the compute node 10, may be performed by the storage system 20, or may be performed by a node or device other than the compute node 10 and that is communicatively connected to the storage system 20. In this embodiment of this disclosure, an example in which the preprocessing is performed by the compute node 10 is used for description. The compute node 10 may obtain the metadata of the first dataset by traversing the first dataset stored in the storage system 20, and store the metadata of the first dataset in the storage system 20. For example, after the compute node 10 obtains the metadata of the first dataset, the compute node 10 packages the metadata of the first dataset to obtain an acceleration package of the metadata of the first dataset, and stores the acceleration package of the metadata of the first dataset in the storage system 20. When the compute node 10 obtains the 1$^{st}$ I/O request used to access the data in the first dataset, the compute node 10 reads the acceleration package of the metadata of the first dataset from the storage system 20 to the second storage medium of the compute node 10 based on the 1$^{st}$ I/O request.

In this embodiment of this disclosure, the storage system 20 may store a plurality of datasets and metadata of each of the plurality of datasets, and the first dataset may be any one of the plurality of datasets. The storage system 20 may be a distributed storage system. For example, the storage system 20 is a distributed file system, and may be specifically a PFS. The distributed storage system is a system in which data is stored in a plurality of independent storage nodes in a distributed manner. The distributed storage system uses an extensible system structure, and uses the plurality of storage nodes to share storage load. This improves reliability, availability, and access efficiency of the system, and facilitates expansion.

Figure 2:
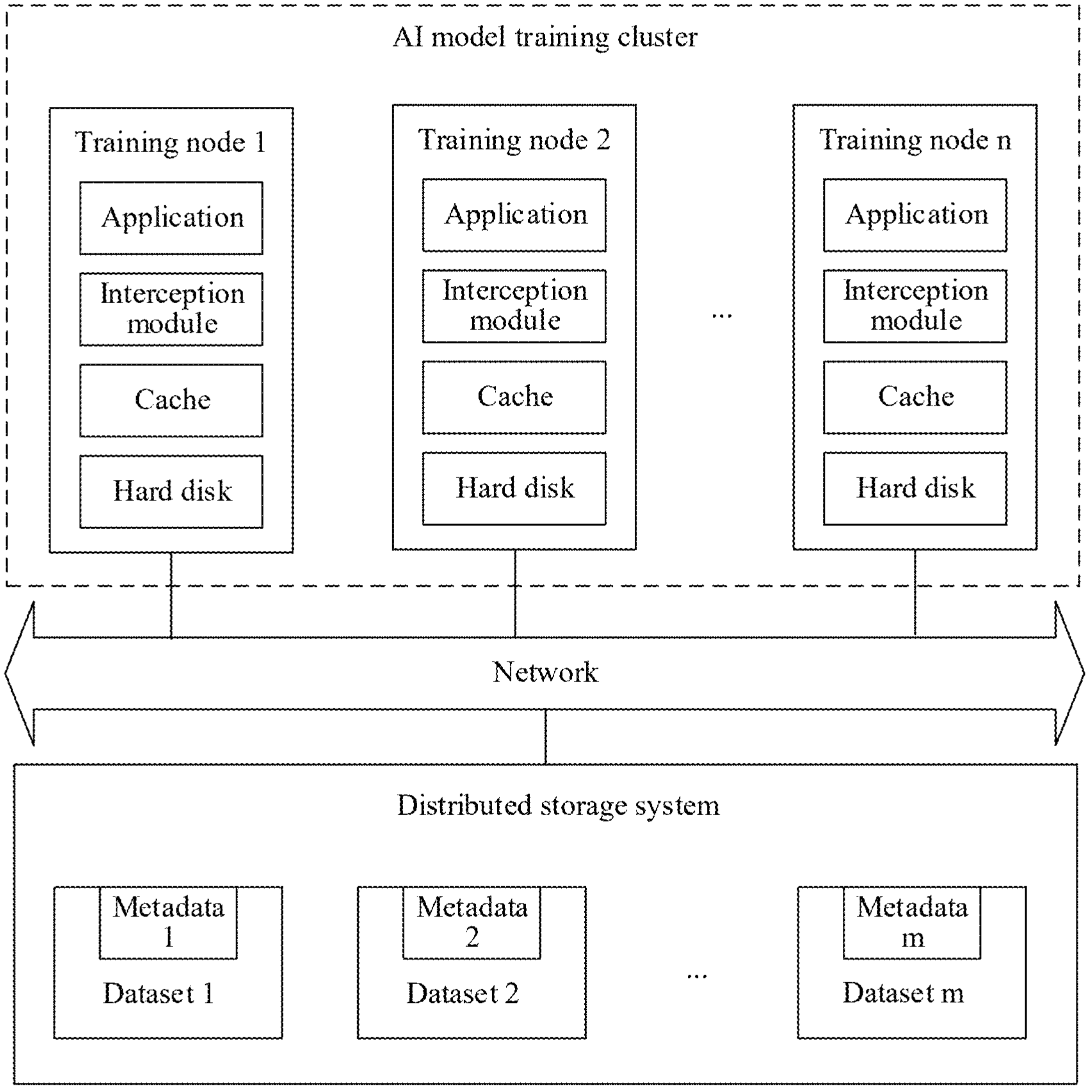
FIG. 2 is a schematic diagram of a structure of another data access system according to an embodiment of this disclosure.

Optionally, the first dataset is a dataset used for AI model training. The compute node 10 is a training node used for AI training. For example, the compute node 10 is any training node in an AI model training cluster. The following uses an example in which the compute node 10 is one training node in the AI model training cluster, the first storage medium is the cache, the second storage medium is the hard disk, and the storage system 20 is the distributed storage system for description. FIG. 2 is a schematic diagram of a structure of another data access system according to an embodiment of this disclosure. The data access system includes an AI model training cluster and a distributed storage system. The AI model training cluster includes training nodes 1 to n (n is an integer greater than 1). Each training node is connected to the distributed storage system via a network, and each training node may include an application, an interception module, a cache, and a hard disk. The distributed storage system may include a plurality of storage nodes (not shown in FIG. 2), and each of the training nodes 1 to n may access any one of the plurality of storage nodes. As shown in FIG. 2, the distributed storage system stores datasets 1 to m (m is an integer greater than 1) and metadata of each of the datasets 1 to m. For example, the distributed storage system stores a dataset 1 and metadata 1, the metadata 1 may be stored in a lower-level directory of the dataset 1, and the metadata 1 is metadata of a dataset 1 obtained by preprocessing the dataset 1. The distributed storage system stores a dataset 2 and metadata 2, the metadata 2 may be stored in a lower-level directory of the dataset 2, and the metadata 2 is metadata of a dataset 2 obtained by preprocessing the dataset 2. The distributed storage system stores a dataset m and metadata m, the metadata m may be stored in a lower-level directory of the dataset m, and the metadata m is metadata of a dataset m obtained by preprocessing the dataset m. Data in a same dataset may be stored in at least two storage nodes in the distributed manner, and metadata in the same dataset may be stored in a same storage node.

A first dataset may be any dataset in the datasets 1 to m, and a compute node 10 may be any training node in the training nodes 1 to n. An example in which the first dataset is the dataset 1, and the compute node 10 is the training node 1 is used for description. When the training node 1 obtains a $1^{st}$ I/O request used to access data in the dataset 1, the training node 1 reads the metadata (namely, the metadata 1) of the dataset 1 from the distributed storage system to a hard disk (that is, a second storage medium) of the training node 1 based on the $1^{st}$ I/O request. When the training node 1 processes an I/O request used to access any piece of data in the dataset 1, the training node 1 searches a cache (that is, a first storage medium) of the training node 1 for metadata of the any piece of data based on the I/O request. If the training node 1 finds the metadata of the any piece of data in the cache of the training node 1, the training node 1 obtains the metadata of the any piece of data from the cache of the training node 1, and obtains the any piece of data from the distributed storage system based on the metadata of the any piece of data. If the training node 1 does not find the metadata of the any piece of data in the cache of the training node 1, the training node 1 obtains the metadata of the any piece of data from the hard disk of the training node 1 based on the I/O request, and obtains the any piece of data from the distributed storage system based on the metadata of the any piece of data. The training node 1 caches the metadata of the any piece of data in the cache of the training node 1.

A person skilled in the art may understand that the data access systems shown in FIG. 1 and FIG. 2 are merely used as examples, and are not intended to limit the technical solutions of this disclosure. In an implementation process, the data access system may further include another node or device, and the compute node, the training node, the storage node, or the like may further include another structure or component. For example, the compute node, the training node, the storage node, or the like may further include a processor and a network interface card, and the storage node may further include a storage device such as a hard disk. The processor is configured to implement a related processing function. For example, the processor in the compute node, the training node, or the like is configured to implement I/O request processing, metadata searching, and metadata obtaining. The network interface card is configured to implement a network connection, and the network interface card in the compute node, the training node, or the like is configured to implement a connection between the compute node, the training node, or the like and the storage system. The compute node, the training node, or the storage node may further include another structure. Details are not described herein.

The foregoing describes the application scenario of this disclosure, and the following describes an embodiment of a data access method in this disclosure.

Figure 3:
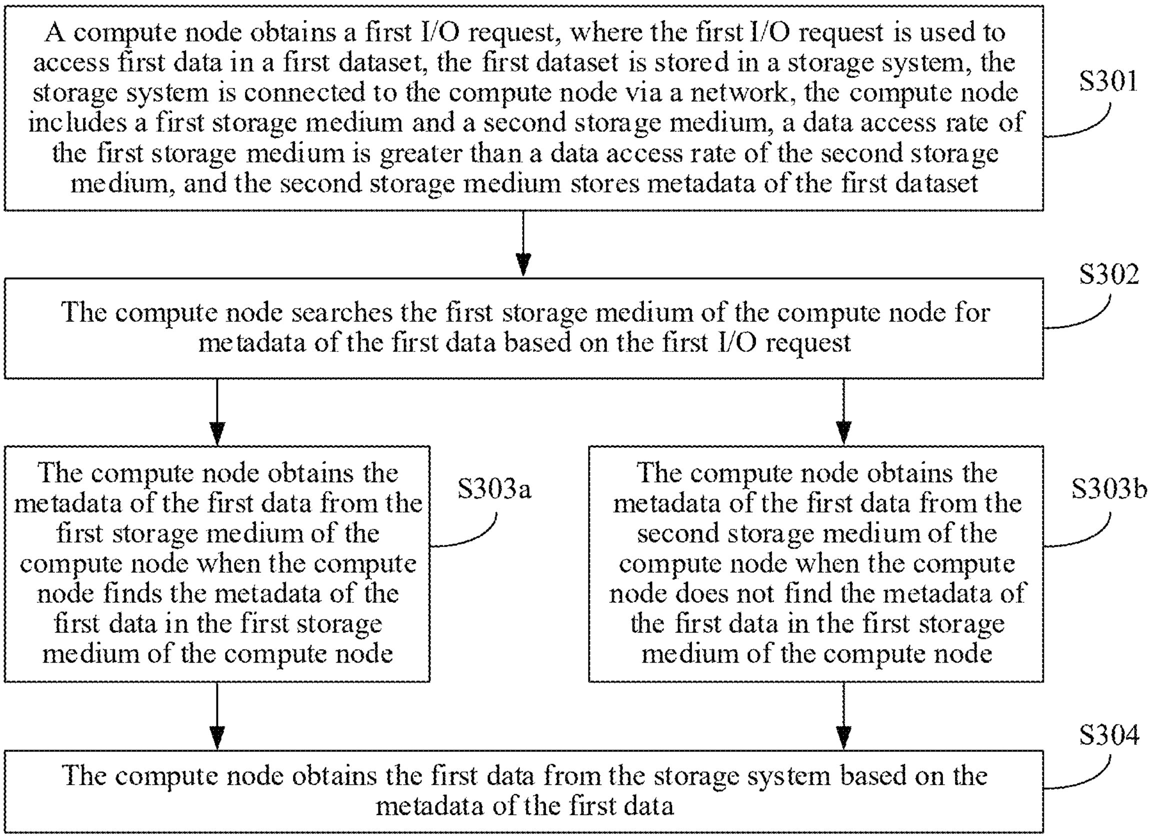
FIG. 3 is a flowchart of a data access method according to an embodiment of this disclosure.

FIG. 3 is a flowchart of a data access method according to an embodiment of this disclosure. The data access method is applied to a compute node. The compute node may be the compute node 10 in FIG. 1 or any training node in FIG. 2. Refer to FIG. 3. The method may include the following steps S301 to S304.

S301: The compute node obtains a first I/O request, where the first I/O request is used to access first data in a first dataset, the first dataset is stored in a storage system, the storage system is connected to the compute node via a network, the compute node includes a first storage medium and a second storage medium, a data access rate of the first storage medium is greater than a data access rate of the second storage medium, and the second storage medium stores metadata of the first dataset.

In an optional embodiment, the first storage medium is a non-persistent storage medium, and the second storage medium is a persistent storage medium. For example, the first storage medium is a cache, and the second storage medium is a hard disk. The second storage medium stores the metadata of the first dataset, the first dataset may be a dataset used for AI model training, and the first dataset may include lots of small files. For example, the metadata of the first dataset may include directory data of the first dataset, metadata of a file included in the first dataset, and metadata of data in the file included in the first dataset. The metadata of the file may include a name of a directory in which the file is located (or a storage path of the file), a file name, file access permission, file creation time, file access time, and a file size. The metadata of any piece of data included in the file may include a storage address of the any piece of data in the storage system, a length of the any piece of data, information about the file in which the any piece of data is located, and the like.

In an optional embodiment, the compute node includes an application, and the compute node obtains the first I/O request by using the application. For example, the application may generate the first I/O request, and the compute node may obtain the first I/O request generated by the application.

In another embodiment, the compute node may receive the first I/O request from another node or device outside of the compute node. A manner in which the compute node obtains the first I/O request is not limited in this embodiment of this disclosure. The first I/O request may be a stat request, an opendir request, an access request, or the like. This is not limited in this embodiment of this disclosure.

In this embodiment of this disclosure, the first I/O request is used to access the first data in the first dataset, and the first I/O request may carry information about the first data. Optionally, the first I/O request carries a storage path of the first data in the storage system. The first data may be a file or data in a file. The storage path of the first data in the storage system may be a storage path of the file in the storage system, and the storage path of the first data in the storage system may be a lower-level directory path (or referred to as a sub-path, an extension path, or the like) of a storage path of the first dataset in the storage system. For example, the storage path of the first dataset in the storage system is "/pfs/Imagenet2012", and the storage path of the first data in the storage system may be "pfs/Imagenet2012/aaa". "Imagenet2012" is a name of the first dataset, and "aaa" is a name of the file in which the first data is located. For example, the first data is the file, and "aaa" is a name of the first data.

S302: The compute node searches the first storage medium of the compute node for metadata of the first data based on the first I/O request.

In a process in which the compute node processes an I/O request, the compute node may cache, in the first storage medium of the compute node, metadata of data that the I/O request requests to access. For any piece of data accessed by the compute node, the first storage medium of the compute node may store metadata of the any piece of data. Therefore, after the compute node obtains the first I/O request, the compute node may search the first storage medium of the compute node for the metadata of the first data based on the first I/O request.

In an optional embodiment, for any piece of data (for example, a file) accessed by the compute node in the storage system, the compute node caches, in the first storage medium of the compute node, correspondence (for ease of description, the correspondence is referred to as correspondence 1) between the metadata of the any piece of data and a storage path of the any piece of data in the storage system. The first I/O request carries the storage path (for ease of description, the storage path that is of the first data in the storage system and that is carried in the first I/O request is referred to as a storage path 1) of the first data in the storage system. The compute node may obtain the storage path 1 carried in the first I/O request, and search for the metadata of the first data based on the storage path 1 and the correspondence 1. For example, the compute node searches the correspondence 1 for the storage path 1. If the compute node finds the storage path 1 in the correspondence 1, the compute node determines that the first storage medium of the compute node stores the metadata of the first data, and determines that metadata that is in the correspondence 1 and that corresponds to the storage path 1 is the metadata of the first data. If the compute node does not find the storage path 1 in the correspondence 1, the compute node determines that the first storage medium of the compute node does not store the metadata of the first data.

In another optional embodiment, for any piece of data (for example, a file) accessed by the compute node in the storage system, the compute node caches, in the first storage medium of the compute node, correspondence (for ease of description, the correspondence is referred to as correspondence 2) between the metadata of the any piece of data and key information (such as a hash value) of a storage path of the any piece of data in the storage system. The first I/O request carries the storage path (for ease of description, the storage path that is of the first data in the storage system and that is carried in the first I/O request is referred to as a storage path 1) of the first data in the storage system. The compute node may obtain the key information of the storage path 1 carried in the first I/O request, and search for the metadata of the first data based on the key information of the storage path 1 and the correspondence 2. For example, the compute node searches the correspondence 2 for the key information of the storage path 1. If the compute node finds the key information of the storage path 1 in the correspondence 2, the compute node determines that the first storage medium of the compute node stores the metadata of the first data, and determines that metadata that is in the correspondence 2 and that corresponds to the key information of the storage path 1 is the metadata of the first data. If the compute node does not find the key information of the storage path 1 in the correspondence 2, the compute node determines that the first storage medium of the compute node does not store the metadata of the first data.

In still another optional embodiment, for any piece of data (for example, a file) accessed by the compute node in the storage system, the compute node caches, in the first storage medium of the compute node, correspondence (for ease of description, the correspondence is referred to as correspondence 3) between an identifier of the any piece of data and a storage path of the any piece of data in the storage system, and caches, in the first storage medium of the compute node, correspondence (for ease of description, the correspondence is referred to as correspondence 4) between the identifier of the any piece of data and the metadata of the any piece of data. The first I/O request carries the storage path (for example, a storage path 1) of the first data in the storage system. The compute node may obtain the storage path 1 carried in the first I/O request, and search for the metadata of the first data based on the storage path 1, the correspondence 3, and the correspondence 4. For example, the compute node searches the correspondence 3 for the storage path 1. If the compute node finds the storage path 1 in the correspondence 3, the compute node determines, as an identifier of the first data, a data identifier that is in the correspondence 3 and that corresponds to the storage path 1. Then, the compute node searches the correspondence 4 for the identifier of the first data. If the compute node finds the identifier of the first data in the correspondence 4, the compute node determines that the first storage medium of the compute node stores the metadata of the first data, and determines that metadata that is in the correspondence 4 and that corresponds to the identifier of the first data is the metadata of the first data. If the compute node does not find the storage path 1 in the correspondence 3, and/or the compute node does not find the identifier of the first data in the correspondence 4, the compute node determines that the first storage medium of the compute node does not store the metadata of the first data.

It should be noted that, the implementation that is provided in S302 and in which the compute node searches the first storage medium of the compute node for the metadata of the first data is merely an example. The compute node may alternatively search the first storage medium of the compute node for the metadata of the first data in another manner. A manner in which the compute node searches the first storage medium of the compute node for the metadata of the first data is related to a manner in which the compute node caches the metadata in the first storage medium of the compute node, and an implementation in which the compute node searches for the metadata of the first data is not limited in this embodiment of this disclosure, provided that a related searching operation can be implemented.

S303*a*: The compute node obtains the metadata of the first data from the first storage medium of the compute node when the compute node finds the metadata of the first data in the first storage medium of the compute node.

In S302, if the compute node finds the metadata of the first data in the first storage medium of the compute node, the compute node performs S303*a*. For example, the compute node obtains the metadata of the first data from the correspondence 1, the correspondence 2, or the correspondence 4 that is cached in the first storage medium of the compute node.

S303*b*: The compute node obtains the metadata of the first data from the second storage medium of the compute node when the compute node does not find the metadata of the first data in the first storage medium of the compute node.

In S302, if the compute node does not find the metadata of the first data in the first storage medium of the compute node, the compute node performs S303*b*. Optionally, the compute node first intercepts the first I/O request via an interception module of the compute node, and changes an access path of the first I/O request to a storage path of the metadata of the first data in the second storage medium of the compute node. Further, the compute node obtains the metadata of the first data from the second storage medium based on the storage path of the metadata of the first data in the second storage medium. The access path of the first I/O request may be the storage path that is of the first data in the storage system and that is carried in the first I/O request. The compute node changes the access path of the first I/O request to the storage path of the metadata of the first data in the second storage medium of the compute node, so that the first I/O request is redirected.

It should be noted that, if the compute node does not intercept the first I/O request, and the compute node does not find the metadata of the first data in the first storage medium of the compute node based on the first I/O request, the compute node directly obtains the metadata of the first data from the storage system based on the first I/O request instead of obtaining the metadata of the first data from the second storage medium of the compute node. In this embodiment of this disclosure, the compute node intercepts the first I/O request, so that the compute node obtains the metadata of the first data from the second storage medium of the compute node when the compute node does not find the metadata of the first data in the first storage medium of the compute node based on the first I/O request, instead of obtaining the metadata of the first data from the storage system. In this way, efficiency of obtaining the metadata of the first data by the compute node can be improved.

Figure 4:
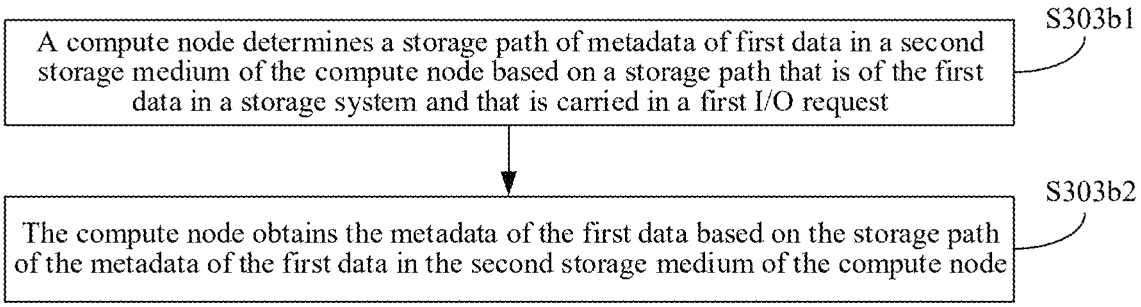
FIG. 4 is a flowchart of obtaining metadata of first data from a second storage medium according to an embodiment of this disclosure.

In an example, FIG. 4 is a flowchart of a method for obtaining the metadata of the first data by the compute node from the second storage medium according to an embodiment of this disclosure. This method procedure includes the following sub-steps S303*b*1 and S303*b*2.

S303*b*1: The compute node determines the storage path of the metadata of the first data in the second storage medium of the compute node based on the storage path that is of the first data in the storage system and that is carried in the first I/O request.

The compute node may store a mapping relationship (for ease of description, the mapping relationship is referred to as a first mapping relationship) between the storage path of the first dataset in the storage system and a storage path of the metadata of the first dataset in the second storage medium of the compute node. The compute node may determine the storage path of the metadata of the first data in the second storage medium of the compute node based on the first mapping relationship and the storage path that is of the first data in the storage system and that is carried in the first I/O request.

In this embodiment of this disclosure, because the first data is included in the first dataset, the storage path of the first data in the storage system is a lower-level directory path (or referred to as a sub-path, an extension path, or the like) of the storage path of the first dataset in the storage system. Because the metadata of the first data is included in the metadata of the first dataset, the storage path of the metadata of the first data in the second storage medium is a lower-level directory path (or referred to as a sub-path, an extension path, or the like) of the storage path of the metadata of the first dataset in the second storage medium. Optionally, the compute node first determines the storage path of the first dataset in the storage system based on the first mapping relationship and the storage path that is of the first data in the storage system and that is carried in the first I/O request. Then, the compute node determines the storage path of the metadata of the first dataset in the second storage medium of the compute node based on the first mapping relationship and the storage path that is of the first dataset in the storage system. Then, the compute node determines the storage path of the metadata of the first data in the second storage medium of the compute node based on the storage path of the metadata of the first dataset in the second storage medium of the compute node. For example, the compute node replaces the storage path that is of the first dataset in the storage system and that is included in the storage path of the first data in the storage system with the storage path of the metadata of the first dataset in the second storage medium of the compute node, to obtain the storage path of the metadata of the first data in the second storage medium.

For example, the first mapping relationship is shown in the following Table 1.

TABLE 1

| Dataset path (DATASET_PATH) | Metadata path (LOCAL_CACHE_PATH) |
|---|---|
| /pfs/Imagenet2012 | /home/cache/meta |

In the first mapping relationship shown in Table 1, "/pfs/Imagenet2012" is the storage path of the first dataset in the storage system, and "/home/cache/meta" is the storage path of the metadata of the first dataset in the second storage medium of the compute node.

It is assumed that the storage path carried in the first I/O request is "/pfs/Imagenet2012/aaa" (in other words, the storage path of the first data in the storage system is "/pfs/Imagenet2012/aaa"). The compute node first determines, based on the first mapping relationship that is shown in Table 1 and the storage path "/pfs/Imagenet2012/aaa", that the storage path of the first dataset in the storage system is "/pfs/Imagenet2012". Then, the compute node determines, based on the first mapping relationship that is shown in Table 1 and the storage path "/pfs/Imagenet2012" that is of the first dataset in the storage system, that the storage path of the metadata of the first dataset in the second storage medium of the compute node is "/home/cache/meta". Then, the compute node replaces the storage path "/pfs/Imagenet2012" that is of the first dataset in the storage system and that is included in the storage path "/pfs/Imagenet2012/aaa", with the storage path "/home/cache/meta" of the metadata of the first dataset in the second storage medium of the compute node, to obtain the storage path of the metadata of the first data in the second storage medium which is "/home/cache/meta/aaa".

**S303*b*2**: The compute node obtains the metadata of the first data based on the storage path of the metadata of the first data in the second storage medium of the compute node.

The compute node may read the metadata of the first data from the second storage medium of the compute node based on the storage path of the metadata of the first data in the second storage medium of the compute node. For example, the storage path of the metadata of the first data in the second storage medium of the compute node is "/home/cache/meta/aaa", and the compute node obtains the metadata of the first data from the second storage medium of the compute node based on the storage path "/home/cache/meta/aaa".

S304: The compute node obtains the first data from the storage system based on the metadata of the first data.

In an optional embodiment, the metadata of the first data includes a storage address of the first data in the storage system, and the compute node obtains the first data from the storage system based on the storage address of the first data in the storage system.

In an optional embodiment, the first data is the file, and the metadata of the first data includes storage addresses that are of data blocks in the file and that are in the storage system. The compute node obtains the data blocks from the storage system based on the storage addresses that are of the data blocks in the file and that are in the storage system. Further, the compute node may obtain the first data.

In conclusion, according to the data access method provided in this embodiment of this disclosure, because the second storage medium of the compute node stores the metadata of the first dataset, after the compute node obtains the first I/O request, the compute node searches the first storage medium of the compute node for the metadata of the first data based on the first I/O request. When the metadata of the first data is not found in the first storage medium of the compute node, the compute node may obtain the metadata of the first data from the second storage medium of the compute node. Compared with obtaining the metadata of the first data from the storage system, that the compute node obtains the metadata of the first data from the second storage medium of the compute node is faster and more efficient. Therefore, storing the metadata of the first dataset in the second storage medium of the compute node can improve efficiency of obtaining the metadata of the first dataset by the compute node. This improves efficiency of obtaining the first dataset by the compute node.

In an optional embodiment, before the compute node obtains the metadata of the first data from the second storage medium of the compute node, the compute node reads the metadata of the first dataset from the storage system to the second storage medium of the compute node. For example, when the compute node processes a $1^{st}$ I/O request used to access data in the first dataset, the compute node reads the metadata of the first dataset from the storage system to the second storage medium of the compute node. The $1^{st}$ I/O request used to access the data in the first dataset may be the foregoing first I/O request, or may not be the foregoing first I/O request. In this embodiment of this disclosure, an example in which the $1^{st}$ I/O request used to access the data in the first dataset is not the foregoing first I/O request is used for description.

Figure 5:
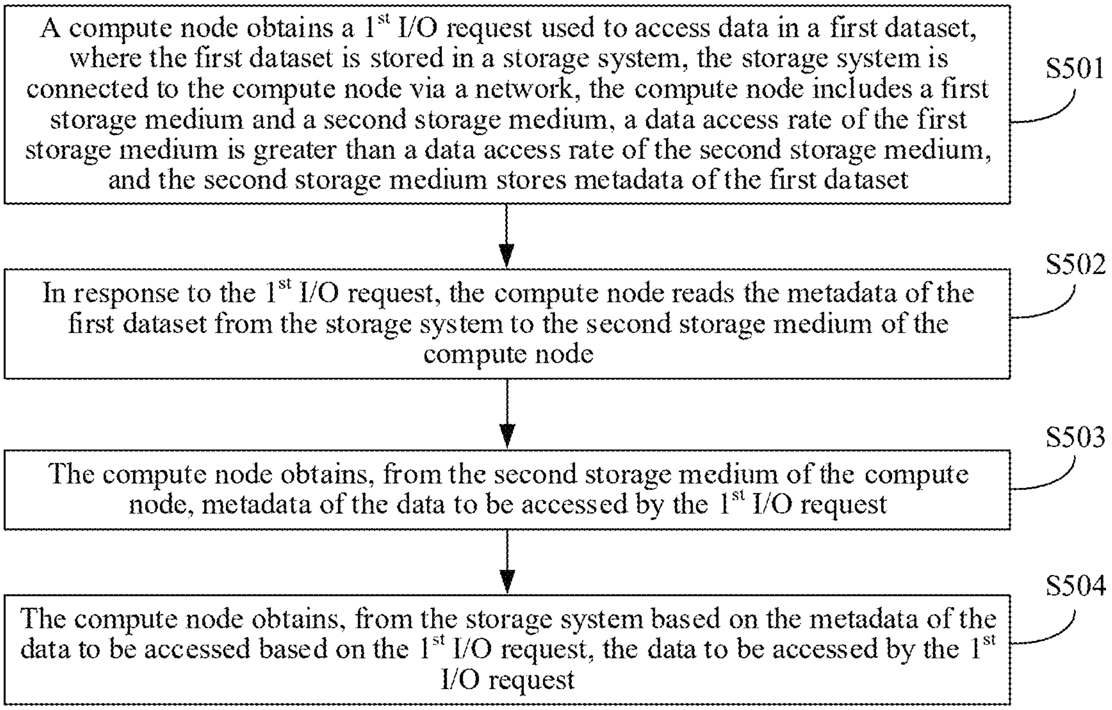
FIG. 5 is a flowchart of another data access method according to an embodiment of this disclosure.

For example, FIG. 5 is a flowchart of another data access method according to an embodiment of this disclosure. The data access method is applied to a compute node. For example, the compute node may be the compute node 10 in FIG. 1 or any training node in FIG. 2. Refer to FIG. 5. The method may include the following steps S501 and S502.

S501: A compute node obtains a $1^{st}$ I/O request used to access data in a first dataset, where the first dataset is stored in a storage system, the storage system is connected to the compute node via a network, the compute node includes a first storage medium and a second storage medium, a data access rate of the first storage medium is greater than a data access rate of the second storage medium, and the second storage medium stores metadata of the first dataset.

Optionally, the compute node obtains the $1^{st}$ I/O request by using an application in the compute node, where the $1^{st}$ I/O request may carry a storage path of the data to be accessed by the $1^{st}$ I/O request in the storage system.

S502: In response to the $1^{st}$ I/O request, the compute node reads the metadata of the first dataset from the storage system to the second storage medium of the compute node.

In this embodiment of this disclosure, the storage system may store the metadata of the first dataset. After the compute node obtains the $1^{st}$ I/O request used to access the data in the first dataset, the compute node may read the metadata of the first dataset from the storage system to the second storage medium of the compute node based on the $1^{st}$ I/O request, so that the second storage medium of the compute node may store the metadata of the first dataset. For example, the storage system stores an acceleration package of the metadata of the first dataset, and the acceleration package of the metadata includes the metadata of the first dataset. The compute node may read the acceleration package of the metadata of the first dataset from the storage system to the second storage medium of the compute node based on the $1^{st}$ I/O request, to read the metadata of the first dataset from the storage system to the second storage medium of the compute node.

In an optional embodiment, after the compute node obtains the $1^{st}$ I/O request used to access the data in the first dataset, the compute node first intercepts the $1^{st}$ I/O request via an interception module of the compute node, and then reads the metadata of the first dataset from the storage system to the second storage medium of the compute node based on the $1^{st}$ I/O request. It should be noted that, if the compute node does not intercept the $1^{st}$ I/O request, the compute node obtains, from the storage system based on the $1^{st}$ I/O request, metadata of the data to be accessed by the $1^{st}$ I/O request. In this embodiment of this disclosure, the compute node intercepts the $1^{st}$ I/O request, so that the compute node may read the metadata of the first dataset from the storage system to the second storage medium of the compute node based on the $1^{st}$ I/O request instead of obtaining, from the storage system, the metadata of the data to be accessed by the $1^{st}$ I/O request.

In an optional embodiment, in the storage system, the metadata (for example, the acceleration package of the metadata of the first dataset) of the first dataset is stored in a lower-level directory of the first dataset. The $1^{st}$ I/O request used to access the data in the first dataset may carry the storage path of the data to be accessed by the $1^{st}$ I/O request in the storage system. The storage path of the data to be accessed by the $1^{st}$ I/O request in the storage system may be a lower-level directory path of a storage path of the first dataset in the storage system. The compute node may determine the storage path of the first dataset in the storage system based on the storage path carried in the $1^{st}$ I/O request; access the first dataset based on the storage path of the first dataset in the storage system, to obtain the metadata of the first dataset from the lower-level directory of the first dataset; and read the metadata of the first dataset to the second storage medium of the compute node. It should be noted that there may be a plurality of files in the lower-level directory of the first dataset. The plurality of files may include a data file and a metadata file (for example, the acceleration package of the metadata). A file name of the metadata file may include a metadata identifier (for example, meta). The compute node may determine the metadata file of the first dataset based on a name of the file included in the lower-level directory of the first dataset, to obtain the metadata that is of the first dataset and that is included in the metadata file.

In this embodiment of this disclosure, a mapping relationship between the storage path of the first dataset in the storage system and a storage path of the metadata of the first dataset in the second storage medium of the compute node may be preconfigured, or may be established after the compute node reads the metadata of the first dataset from the storage system to the second storage medium of the compute node. In an optional embodiment, the mapping relationship is preconfigured. For example, the compute node configures the mapping relationship in the compute node by preconfiguring the file or an environment variable of the compute node. Before the compute node reads the metadata of the first dataset from the storage system to the second storage medium of the compute node, the compute node determines the storage path of the metadata of the first dataset in the second storage medium of the compute node based on the storage path of the first dataset in the storage system and the preconfigured mapping relationship. Further, the compute node reads the metadata of the first dataset from the storage system to the second storage medium of the compute node based on the storage path of the metadata of the first dataset in the second storage medium of the compute node. In another optional embodiment, the mapping relationship is established after the compute node reads the metadata of the first dataset from the storage system to the second storage medium of the compute node. The compute node first reads the metadata of the first dataset from the storage system to the second storage medium of the compute node. Then, the compute node establishes the mapping relationship based on the storage path of the first dataset in the storage system and the storage path of the metadata of the first dataset in the second storage medium of the compute node.

In an optional embodiment, before S502, the compute node searches, based on the $1^{st}$ I/O request, the first storage medium of the compute node for the metadata of the data to be accessed by the $1^{st}$ I/O request. If the compute node finds, in the first storage medium of the compute node, the metadata of the data to be accessed by the $1^{st}$ I/O request, the compute node obtains, from the first storage medium of the compute node, the metadata of the data to be accessed by the $1^{st}$ I/O request, and obtains, from the storage system based on the metadata of the data to be accessed by the $1^{st}$ I/O request, the data to be accessed by the $1^{st}$ I/O request. If the compute node does not find, in the first storage medium of the compute node, the metadata of the data to be accessed by the $1^{st}$ I/O request, the compute node searches the second storage medium of the compute node for the metadata of the data to be accessed by the $1^{st}$ I/O request. If the compute node finds, in the second storage medium of the compute node, the metadata of the data to be accessed by the $1^{st}$ I/O request, the compute node obtains, from the second storage medium of the compute node, the metadata of the data to be accessed by the $1^{st}$ I/O request, and obtains, from the storage system based on the metadata of the data to be accessed by the $1^{st}$ I/O request, the data to be accessed by the $1^{st}$ I/O request. The compute node caches, in the first storage medium of the compute node, the metadata of the data to be accessed by the $1^{st}$ I/O request. If the compute node does not find, in the second storage medium of the compute node, the metadata of the data to be accessed by the $1^{st}$ I/O request, the compute node determines that the $1^{st}$ I/O request is the $1^{st}$ I/O request that is obtained by the compute node and that is used to access the data in the first dataset, and the compute node performs S502. In this embodiment of this disclosure, an example in which the compute node does not find, in the first storage medium of the compute node and the second storage medium of the compute node, the metadata of the data to be accessed by the $1^{st}$ I/O request is used for description. Therefore, the compute node performs S502.

In an optional embodiment, after S502, the data access method further includes the following steps S503 and S504.

S503: The compute node obtains, from the second storage medium of the compute node, the metadata of data to be accessed by the $1^{st}$ I/O request.

S504: The compute node obtains, from the storage system based on the metadata of the data to be accessed by the $1^{st}$ I/O request, the data to be accessed by the $1^{st}$ I/O request.

For implementation processes of S503 and S504, refer to S303*b* and S304. Details are not described herein again.

In conclusion, according to the data access method provided in this embodiment of this disclosure, after the compute node obtains the $1^{st}$ I/O request used to access the data in the first dataset, the compute node reads the metadata of the first dataset from the storage system to the second storage medium of the compute node based on the $1^{st}$ I/O request. In this way, when the compute node processes an I/O request used to access the data in the first dataset, the compute node may obtain the metadata of the data in the first dataset from the second storage medium of the compute node. This improves efficiency of obtaining the metadata of the first dataset by the compute node.

In this embodiment of this disclosure, the metadata of the first dataset stored in the storage system is obtained by preprocessing the first dataset stored in the storage system. The preprocessing may be performed by the compute node, may be performed by the storage system, or may be performed by a node or device other than the compute node and that is communicatively connected to the storage system. For example, the preprocessing is performed by a node that stores the first dataset in the storage system. After storing the first dataset in the storage system, the node may preprocess the first dataset, to obtain the metadata of the first dataset; and store the metadata of the first dataset in the storage system. In this embodiment of this disclosure, an example in which the preprocessing is performed by the compute node is used for description. Optionally, before the compute node obtains the I/O request used to access the data in the first dataset, the compute node obtains the metadata of the first dataset by traversing the first dataset stored in the storage system, and stores the metadata of the first dataset in the storage system. For example, the compute node packages the metadata of the first dataset, to obtain the acceleration package of the metadata of the first dataset. The compute node stores the acceleration package of the metadata of the first dataset in the lower-level directory of the first dataset.

In an optional embodiment, the compute node includes an executable program used to preprocess the first dataset. The executable program preprocesses the first dataset stored in the storage system, to obtain the metadata of the first dataset;

and stores the metadata of the first dataset in the storage system. A person skilled in the art may understand that if a node or device other than the compute node preprocesses the first dataset, the node or device may also include an executable program used to preprocess the first dataset. This is not limited in this embodiment of this disclosure.

In the technical solutions provided in this embodiment of this disclosure, the first dataset is preprocessed to obtain the metadata of the first dataset, and the metadata of the first dataset is stored in a storage system. When the compute node processes the 1st I/O request used to access the data in the first dataset, the compute node reads the metadata of the first dataset from the storage system to a local hard disk of the compute node. In a process of processing the I/O request used to access the data in the first dataset, with reference to an I/O interception technology, the compute node changes an access path of the I/O request, to implement I/O request redirection, so that the compute node obtains, from the local hard disk of the compute node, metadata of data to be accessed by the I/O request. This greatly improves the efficiency of obtaining the metadata of the first dataset by the compute node. The technical solutions provided in this disclosure are applicable to access to various datasets, and in particular, are applicable to access to datasets used for AI model training, so that access efficiency of metadata of these datasets can be greatly improved, and a dataset access acceleration problem can be resolved.

The foregoing embodiment is described by using an example in which the compute node obtains (that is, reads) the data in the first dataset from the storage system. The compute node may further write data into the storage system. For example, the compute node may further write a file into the storage system. For a write operation, the compute node may write the file and metadata of the file into the storage system, and the compute node may write the metadata of the file into the second storage medium of the compute node, to subsequently access the metadata of the file in the second storage medium of the compute node. This improves access efficiency of the metadata.

The foregoing describes the method embodiments of this disclosure. The following describes apparatus embodiments of this disclosure. The apparatus in this disclosure may be configured to perform the method in this disclosure. For details not disclosed in the apparatus embodiments of this disclosure, refer to the method embodiments of this disclosure.

Figure 6:
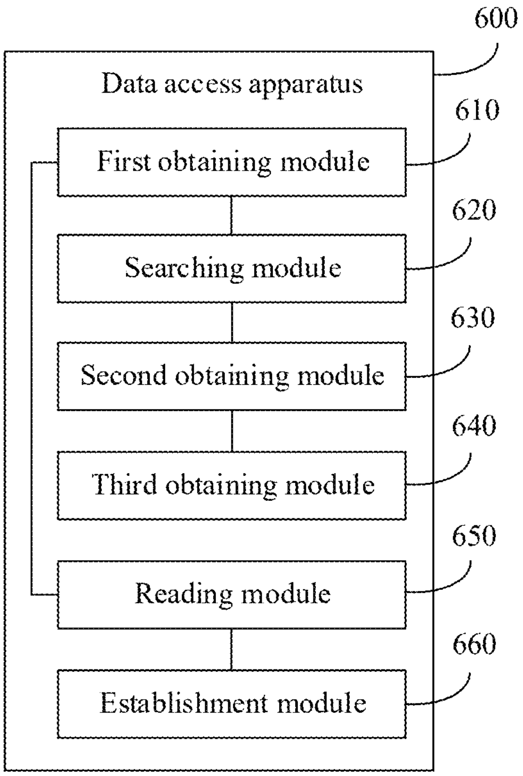
FIG. 6 is a schematic diagram of a structure of a data access apparatus according to an embodiment of this disclosure.

FIG. 6 is a schematic diagram of a structure of a data access apparatus 600 according to an embodiment of this disclosure. The data access apparatus 600 is used in a compute node. For example, the data access apparatus 600 is the compute node or a functional component in the compute node. The compute node may be the compute node 10 shown in FIG. 1 or any training node in FIG. 2, where the compute node includes a first storage medium and a second storage medium, a data access rate of the first storage medium is greater than a data access rate of the second storage medium, the second storage medium stores metadata of a first dataset, the first dataset is stored in a storage system, and the storage system is connected to the compute node via a network. Refer to FIG. 6. The data access apparatus 600 includes: a first obtaining module 610, a searching module 620, a second obtaining module 630, and a third obtaining module 640.

The first obtaining module 610 is configured to obtain a first I/O request, where the first I/O request is used to access first data in the first dataset. For function implementation of the first obtaining module 610, refer to related descriptions in S301.

The searching module 620 is configured to search the first storage medium for metadata of the first data based on the first I/O request. For function implementation of the searching module 620, refer to related descriptions in S302.

The second obtaining module 630 is configured to obtain the metadata of the first data from the second storage medium when the metadata of the first data is not found in the first storage medium. For function implementation of the second obtaining module 630, refer to related descriptions in S303*b*.

The third obtaining module 640 is configured to obtain the first data from the storage system based on the obtained metadata of the first data. For function implementation of the third obtaining module 640, refer to related descriptions in S304.

Optionally, the first I/O request carries a storage path of the first data in the storage system. The second obtaining module 630 is configured to: determine a storage path of the metadata of the first data in the second storage medium based on the storage path that is of the first data in the storage system and that is carried in the first I/O request; and obtain the metadata of the first data based on the storage path of the metadata of the first data in the second storage medium.

Optionally, the compute node stores a mapping relationship between a storage path of the first dataset in the storage system and a storage path of the metadata of the first dataset in the second storage medium. The second obtaining module 630 is configured to determine the storage path of the metadata of the first data in the second storage medium based on the mapping relationship and the storage path that is of the first data in the storage system and that is carried in the first I/O request.

Optionally, the data access apparatus 600 further includes: a reading module 650, configured to: in response to a 1st I/O request used to access data in the first dataset, read the metadata of the first dataset from the storage system to the second storage medium; and an establishment module 660, configured to establish the mapping relationship between the storage path of the first dataset in the storage system and the storage path of the metadata of the first dataset in the second storage medium. For function implementation of the reading module 650 and the establishment module 660, refer to related descriptions in S502.

Optionally, the data access apparatus 600 further includes a reading module 650, configured to: in response to a 1st I/O request used to access data in the first dataset, read the metadata of the first dataset from the storage system to the second storage medium based on the mapping relationship. For function implementation of the reading module 650, refer to related descriptions in S502.

Optionally, the first storage medium is a non-persistent storage medium, and the second storage medium is a persistent storage medium.

Optionally, the compute node is any training node in an AI model training cluster, and the first dataset is a dataset used for AI model training.

Optionally, the storage system is a distributed storage system.

In conclusion, according to the data access apparatus provided in this embodiment of this disclosure, because the second storage medium of the compute node stores the metadata of the first dataset, after the compute node obtains the first I/O request, the compute node searches the first storage medium of the compute node for the metadata of the first data based on the first I/O request. When the metadata of the first data is not found in the first storage medium of the compute node, the compute node may obtain the metadata of the first data from the second storage medium of the compute node. Compared with obtaining the metadata of the first data from the storage system, that the compute node obtains the metadata of the first data from the second storage medium of the compute node is faster and more efficient. Therefore, storing the metadata of the first dataset in the second storage medium of the compute node can improve efficiency of obtaining the metadata of the first dataset by the compute node. This improves efficiency of obtaining the first dataset by the compute node.

It should be understood that the data access apparatus provided in this embodiment of this disclosure may further be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. Alternatively, the data access method provided in the foregoing method embodiments may be implemented by using software. When the data access method provided in the foregoing method embodiments is implemented by using the software, each module in the data access apparatus may be a software module.

Figure 7:
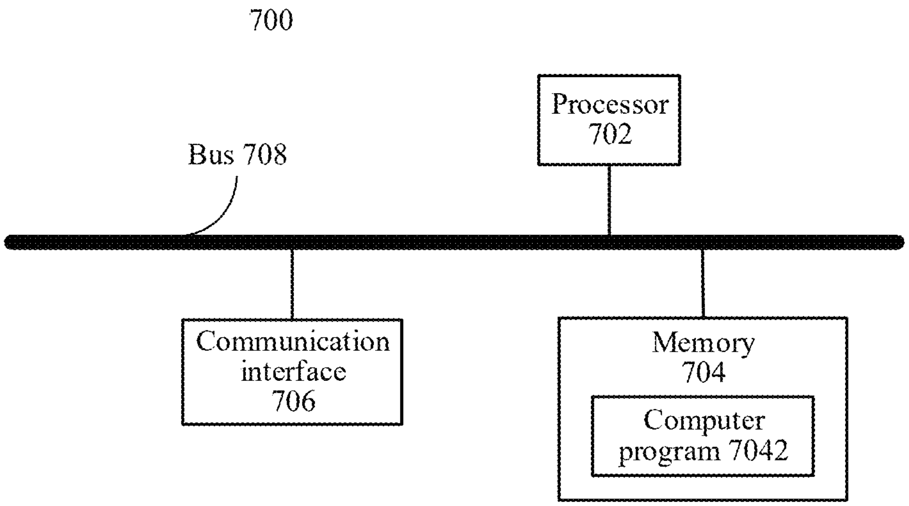
FIG. 7 is a schematic diagram of a structure of another data access apparatus according to an embodiment of this disclosure.

FIG. 7 is a schematic diagram of a structure of a data access apparatus 700 according to an embodiment of this disclosure. The data access apparatus 700 includes a processor 702, a memory 704, a communication interface 706, and a bus 708. The processor 702, the memory 704, and the communication interface 706 are communicatively connected to each other through the bus 708. A connection manner between the processor 702, the memory 704, and the communication interface 706 shown in FIG. 7 is merely an example. In an implementation process, the processor 702, the memory 704, and the communication interface 706 may alternatively be communicatively connected to each other in a connection manner other than the bus 708.

The memory 704 may be configured to store a computer program 7042. The computer program 7042 may include instructions and data. The memory 704 may be various types of storage media, for example, a read-only memory (ROM), a random access memory (RAM), a non-volatile RAM (NVRAM), a programmable ROM (PROM), an erasable PROM (EPROM), an electrically erasable PROM (EEPROM), a flash memory, an optical memory, and a register. The memory 704 in FIG. 7 generally refers to various possible storage media that may be included in the data access apparatus 700, and does not specifically refer to a specific storage medium included in the data access apparatus 700. For example, the memory 704 in FIG. 7 may include but is not limited to the foregoing first storage medium and second storage medium. The first storage medium may be a cache, and the second storage medium may be a hard disk. In other words, the memory 704 in FIG. 7 may include the cache and the hard disk.

The processor 702 may be a general-purpose processor. The general-purpose processor may be a processor that reads and executes a computer program (for example, the computer program 7042) stored in a memory (for example, the memory 704) to perform a specific step and/or operation. In a process of performing the foregoing step and/or operation, the general-purpose processor may use data stored in the memory (for example, the memory 704). The stored computer program may be executed, for example, to implement related functions of the first obtaining module 610, the searching module 620, the second obtaining module 630, the third obtaining module 640, the reading module 650, and the establishment module 660. The general-purpose processor may be, for example, but not limited to, a CPU. In addition, the processor 702 may alternatively be a dedicated processor. The dedicated processor may be a processor specially designed to perform a specific step and/or operation. The dedicated processor may be, for example, but not limited to, a digital signal processor (DSP), an ASIC, and an FPGA. In addition, the processor 702 may alternatively be a combination of a plurality of processors, for example, a multi-core processor. The processor 702 may include at least one circuit, to perform all or some of the steps in the data access method provided in the foregoing embodiments.

The communication interface 706 may include an input/output (I/O) interface, a physical interface, a logical interface, and the like that are configured to implement interconnection between components in the data access apparatus 700, and an interface that is configured to implement interconnection between the data access apparatus 700 and another device or system (for example, a storage system). The physical interface may be a gigabit Ethernet (GE) interface, and may be configured to implement interconnection between the data access apparatus 700 and another device. The logical interface is an interface in the data access apparatus 700, and may be configured to implement interconnection between components in the data access apparatus 700. The communication interface 706 may be used for communication between the data access apparatus 700 and the storage system, for example, used for data receiving and sending between the data access apparatus 700 and the storage system.

The bus 708 may be any type of communication bus, for example, a system bus, used to implement interconnection between the processor 702, the memory 704, and the communication interface 706.

The foregoing components may be separately disposed on chips that are independent of each other, or at least some or all of the components may be disposed on a same chip. Whether the components are independently disposed on different chips or are integrated on one or more chips usually depends on a requirement of a product design. Specific implementation forms of the foregoing components are not limited in this embodiment of this disclosure.

The data access apparatus 700 shown in FIG. 7 is merely an example. In an implementation process, the data access apparatus 700 may further include other components, which are not listed one by one in this specification. The data access apparatus 700 shown in FIG. 7 may perform data access by performing all or some of the steps of the data access method in the foregoing embodiments.

Corresponding to FIG. 1, the data access apparatus 700 in FIG. 7 is the compute node 10 in FIG. 1 or a functional module in the compute node 10.

Corresponding to FIG. 2, the data access apparatus 700 in FIG. 7 is any training node in FIG. 2 or a functional module in the training node.

When the data access apparatus 600 shown in FIG. 6 is implemented in the data access apparatus 700 shown in FIG. 7, in actual product implementation, functions of the modules in the data access apparatus 600 shown in FIG. 6 may be implemented by the processor 702 in FIG. 7, or may be implemented by the processor 702 in FIG. 7 by invoking the computer program 7042 in the memory 704.

An embodiment of this disclosure provides a data access system, including a compute node and a storage system. The compute node is connected to the storage system via a network, and the compute node includes the data access apparatus shown in FIG. 6 or FIG. 7.

An embodiment of this disclosure provides a computer-readable storage medium.

The computer-readable storage medium stores a computer program. When the computer program is executed (for example, executed by a compute node or one or more processors), all or some of the steps of the data access method provided in the foregoing method embodiments are implemented.

An embodiment of this disclosure provides a computer program product. The computer program product includes a program or code. When the program or the code is executed (for example, executed by a compute node or one or more processors), all or some of the steps of the data access method provided in the foregoing method embodiments are implemented.

An embodiment of this disclosure provides a chip. The chip includes a programmable logic circuit and/or program instructions. When being run, the chip is configured to implement all or some of the steps of the data access method provided in the foregoing method embodiments.

All or some of the foregoing embodiments may be implemented by using software, hardware, firmware, or any combination thereof. When embodiments are implemented by using the software, all or some of embodiments may be implemented in a form of a computer program product. The computer program product includes one or more computer instructions. When the computer program instructions are loaded and executed on a computer, all or some of the procedures or functions in embodiments of this disclosure are generated. The computer may be a general-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or includes a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be understood that, in this disclosure, the term “at least one” means one or more, and the term “a plurality of” means two or more. In this disclosure, unless otherwise specified, the symbol “/” generally represents “or”. For example, A/B may represent A or B. The term “and/or” in this disclosure describes only an association relationship for describing associated objects and represents that three relationships may exist. For example, A and/or B may represent the following three cases: Only A exists, both A and B exist, and only B exists. In addition, for ease of clear description, in this disclosure, words such as “first”, “second”, and “third” are used to distinguish between same items or similar items whose functions and purposes are basically the same. A person skilled in the art may understand that the terms such as “first”, “second”, and “third” do not limit a quantity and an execution sequence.

Different types of embodiments such as the method embodiments and the apparatus embodiments provided in embodiments of this disclosure may be cross-referenced. This is not limited in embodiments of this disclosure. An order of operations in the method embodiments provided in embodiments of this disclosure can be properly adjusted, and an operation can be added or deleted based on a situation. Any variation method that can be easily figured out by a person skilled in the art within the technical scope disclosed in this disclosure shall fall within the protection scope of this disclosure. Therefore, details are not described again.

In the corresponding embodiments provided in this disclosure, it should be understood that the disclosed apparatus and the like may be implemented in other composition manners. For example, the described apparatus embodiments are merely examples. For example, division into the units is merely logical function division and may be other division in actual implementation. For example, a plurality of units or components may be combined or integrated into another system, or some features may be ignored or not performed.

The units described as separate parts may or may not be physically separate, and parts described as units may or may not be physical units, may be located at one position, or may be distributed on a plurality of nodes. Some or all of the units may be selected based on an actual requirement to achieve the objective of the solutions of embodiments.

The foregoing descriptions are merely example implementations of this disclosure, but are not intended to limit the protection scope of this disclosure. Any equivalent modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:

obtaining, by a compute node, a first input/output (I/O) request, wherein the first I/O request is used to access first data in a first dataset which is stored in a storage system connected to the compute node via a network;

searching, by the compute node, a first storage medium of the compute node before searching a second storage medium of the compute node for metadata of the first data based on the first I/O request, wherein the metadata of the first data is stored in the first storage medium or the second storage medium, and wherein a data access rate of the second storage medium is lower than a data access rate of the first storage medium;

obtaining, by the compute node, the metadata of the first data from the second storage medium of the compute node based on the metadata of the first data not being found in the first storage medium; and obtaining, by the compute node, the first data from the storage system based on the obtained metadata of the first data, wherein the obtaining, by the compute node, the metadata of the first data from the second storage medium comprises:

determining, by the compute node, the storage path of the metadata of the first data in the second storage medium based on a mapping relationship and the storage path of the first data in the storage system that is carried in the first I/O request, wherein the compute node stores the mapping relationship between a storage path of the first dataset in the storage system and a storage path of the metadata of the first dataset in the second storage medium; and obtaining, by the compute node, the metadata of the first data based on the storage path of the metadata of the first data in the second storage medium.

2. The method according to claim 1, wherein the method further comprises:

in response to a 1st I/O request used to access data in the first dataset, reading, by the compute node, the metadata of the first dataset from the storage system to the second storage medium, and establishing the mapping relationship.

3. The method according to claim 1, wherein the method further comprises:

in response to a 1st I/O request used to access data in the first dataset, reading, by the compute node, the metadata of the first dataset from the storage system to the second storage medium based on the mapping relationship.

4. The method according to claim 1, wherein the first storage medium is a non-persistent storage medium, and the second storage medium is a persistent storage medium.

5. The method according to claim 1, wherein the compute node is a training node in an artificial intelligence (AI) model training cluster, and the first dataset is a dataset used for AI model training.

6. The method according to claim 1, wherein the storage system is a distributed storage system.

7. A data access apparatus, comprising:

a memory configured to store a computer program; and at least one processor configured to execute the computer program stored in the memory, to enable the data access apparatus to:

obtain a first input/output (I/O) request, wherein the first I/O request is used to access first data in a first dataset which is stored in a storage system connected to the data access apparatus via a network;

search a first storage medium of the data access apparatus before searching a second storage medium of the data access apparatus for metadata of the first data based on the first I/O request, wherein the metadata of the first data is stored in the first storage medium or the second storage medium, and wherein a data access rate of the second storage medium is lower than a data access rate of the first storage medium;

obtain the metadata of the first data from the second storage medium of the data access apparatus based on the metadata of the first data not being found in the first storage medium; and obtain the first data from the storage system based on the obtained metadata of the first data, wherein the at least one processor is configured to execute the computer program stored in the memory, to enable the data access apparatus to:

determine the storage path of the metadata of the first data in the second storage medium based on a mapping relationship and the storage path of the first data in the storage system that is carried in the first I/O request, wherein the data access apparatus stores the mapping relationship between a storage path of the first dataset in the storage system and a storage path of the metadata of the first dataset in the second storage medium; and obtain the metadata of the first data based on the storage path of the metadata of the first data in the second storage medium.

8. The apparatus according to claim 7, the at least one processor is configured to execute the computer program stored in the memory, to further enable the data access apparatus to:

in response to a 1st I/O request used to access data in the first dataset, read the metadata of the first dataset from the storage system to the second storage medium, and establish the mapping relationship.

9. The apparatus according to claim 7, the at least one processor is configured to execute the computer program stored in the memory, to further enable the data access apparatus to:

in response to a 1st I/O request used to access data in the first dataset, read the metadata of the first dataset from the storage system to the second storage medium based on the mapping relationship.

10. The apparatus according to claim 7, wherein the first storage medium is a non-persistent storage medium, and the second storage medium is a persistent storage medium.

11. The apparatus according to claim 7, wherein the data access apparatus is a training node in an artificial intelligence (AI) model training cluster, and the first dataset is a dataset used for AI model training.

12. The apparatus according to claim 7, wherein the storage system is a distributed storage system.

13. A system, comprising:

a storage system configured to store a first dataset; and a compute node connected to the storage system via a network, which comprises:

a first storage medium;

a second storage medium, wherein a data access rate of the first storage medium is greater than a data access rate of the second storage medium, and at least one processor, configured to:

obtain a first input/output (I/O) request, wherein the first I/O request is used to access first data in the first dataset;

search the first storage medium before searching the second storage medium for metadata of the first data based on the first I/O request, wherein the metadata of the first data is stored in the first storage medium or the second storage medium;

obtain the metadata of the first data from the second storage medium of the compute node based on the metadata of the first data not being found in the first storage medium; and obtain the first data from the storage system based on the obtained metadata of the first data, wherein the at least one processor is configured to:

determine the storage path of the metadata of the first data in the second storage medium based on a mapping relationship and the storage path of the first data in the storage system that is carried in the first I/O request, wherein the compute node stores the mapping relationship between a storage path of the first dataset in the storage system and a storage path of the metadata of the first dataset in the second storage medium; and obtain the metadata of the first data based on the storage path of the metadata of the first data in the second storage medium.

14. The system according to claim 13, wherein the at least one processor is configured to:

in response to a 1st I/O request used to access data in the first dataset, read the metadata of the first dataset from the storage system to the second storage medium, and establish the mapping relationship.

15. The system according to claim 13, wherein the at least one processor is configured to:

in response to a $1^{st}$ I/O request used to access data in the first dataset, read the metadata of the first dataset from the storage system to the second storage medium based on the mapping relationship.

16. The system according to claim 13, wherein the first storage medium is a non-persistent storage medium, and the second storage medium is a persistent storage medium.

17. The system according to claim 13, wherein the compute node is a training node in an artificial intelligence (AI) model training cluster, and the first dataset is a dataset used for AI model training.

18. The system according to claim 13, wherein the storage system is a distributed storage system.

* * * * *